United States Patent Office 2,930,695
Patented Mar. 29, 1960

2,930,695
ANIMAL FEED SUPPLEMENT

Lawrence Rosner and Raymond O. Foster, Chicago, Ill., assignors to Rosner-Hixson Laboratories, Inc., Chicago, Ill., a corporation of Illinois No Drawing. Application February 23, 1956
Serial No. 567,071

6 Claims. (Cl. 99—2)

This invention relates to an improved feed supplement for animals and to its production. More specifically, it pertains to a feed supplement wherein the biologically active constituents are shielded from contact with persons who handle and process such feed. In particular, it concerns a feed supplement containing diethylstilbestrol in an innocuous form.

For more than a decade it has been known that trace amounts of certain estrogens in animal feeds improve the quality of the meat in a relatively short time. For instance, it was reported in 1945 that feeding diethylstilbestrol to cockerels at the rate of one milligram per bird per day produced a definite improvement in the market quality of the chickens and gave birds of superior dress-out quality in three to four weeks. Similar studies on steers have shown that about 10 milligrams of diethylstilbestrol per steer per day will produce a weight gain of as much as 35% and reduce feed costs as much as 20% without producing any difference in the quality of the meat. Originally the diethylstilbestrol was administered by implantation, but this method has numerous drawbacks, including the difficulty of implanting pellets in each steer, lack of control once the pellets are inserted, and inability to ascertain daily intake of estrogen.

As a consequence of the foregoing, there has developed the practice of adding estrogens, particularly diethylstilbestrol, to animal feeds, thereby to improve the quality and quantity of the meat. In 1955 it was calculated that about 50% of all steers in feedlots in the United States were treated with diethylstilbestrol in the form of feed supplements. This widespread use of a very potent estrogen has given rise to a serious problem of handling feed supplements. It is well known that diethylstilbestrol and other estrogens are absorbed through the skin and the respiratory tract, and when so absorbed can produce secondary female sex characteristics in males. In the chemical and pharmaceutical industries, rigorous precautions are observed to avoid contact with such materials. In the animal feed industry, however, there is much more danger of contact because of the nature of the personnel and the lack of scientific control. The danger is even more acute on farms and in feeding yards where the workers may not even be aware of the problem. It has, therefore, become important to develop a biologically active feed supplement which is safe and easy to handle and which has no significant physiological effect on contact with the skin or on inhalation as dust.

It is an object of this invention to develop a biologically active feed supplement which is innocuous to the skin and respiratory system.

It is another object to provide an animal feed ingredient which is physiologically effective when ingested and which is safe for humans to handle.

A further object of the invention is to provide a method of producing such biologically active feed supplements.

These and other objects will be apparent from the following disclosure.

Broadly, the invention comprises one or more physiologically active materials, such as an estrogen or mixture of estrogens, in a readily assimilable gelled vehicle wherein the active constituent is shielded from contact with humans. Among the physiologically active substances to which the invention may be adapted are estrogens such as diethylstilbestrol, dienestrol and hexestrol, and sulfa drugs such as sulfaquinoxaline which have irritating dermatological and respiratory effects. The invention is particularly adapted to protecting personnel from contact with diethylstilbestrol.

The assimilable gel may be any natural or synthetic water-soluble colloid which is nontoxic for animal consumption. It may be natural material such as gelatin, agar, alginates or pectin, or it may be a synthetic low molecular weight polymer such as polyvinyl alcohol or polyvinylpyrrolidone. It may also be a denatured material such as a cellulose ether, including methylcellulose and carboxymethycellulose, or peptide material of an edible nature. The primary requisite of the vehicle is its ability to form a gel which is firm at temperatures ordinarily encountered in the handling and shipping of feeds or feed supplements. The vehicle should also, of course, be nontoxic upon ingestion, as the foregoing substances are, and should be assimilated by animal digestive systems to the extent that the physiologically active material contained is released and made available for absorption, although it is not necessary that the vehicle have any food value per se.

It is usually desirable to add nontoxic binders or plasticizers to the vehicle to improve the characteristics of the gel and to aid in the dispersion of the active ingredients. Suitable for these purposes are polyhydroxy organic compounds including sugars and derivatives thereof, such as corn syrup, glycerol, mannitol, sorbitol, glucose, sucrose, dextran and dextrins. These materials are preferably added in the form of syrups, usually in water.

In the practice of the invention, it is advantageous to form a solution of the gelable vehicle and binder or plasticizer in warm or hot water and add to a measured volume of such solution a carefully weighed quantity of active ingredient. The mixture is stirred until the materials are dissolved or uniformly dispersed and then the liquid is cooled and allowed to gel. The gel is then comminuted and ground to a fine powder. A useful technique for this purpose is to mix the gel with solid carbon dioxide and grind the mass at low temperature. The powder, after the carbon dioxide has sublimed, is washed with an organic solvent in which the gel is insoluble to remove any of the physiologically active material which may be on the surface of the particles. For instance, acetone may be used for a gelatine vehicle, ether for a starch vehicle and petroleum ether for a polyvinylpyrrolidone vehicle. The dry powder may then be assayed for its content of active material if precise values are desired. Otherwise, the dry powder is ready for incorporation in animal feeds of the usual types.

The following examples illustrate typical formulations which embody our invention, but are not intended to restrict or limit the scope thereof. It will be readily understood by those skilled in the art that relative amounts of materials may be varied and equivalent ingredients substituted for those named without departing from the invention.

EXAMPLE 1

Fifty grams of gelatin was combined with 100 grams of corn syrup and 200 milliliters of water and heated in a boiling water bath until the material was in solution. The material was allowed to cool to about 50° C. One and one-half grams of diethylstilbestrol was dissolved in 60 milliliters of acetone and added with stirring to the cooled mixture. The material was placed in a shallow pan to cool. After 24 hours, the material had jelled sufficiently to be removed and cut into small pieces, frozen, and milled to a suitable particle size with solid carbon dioxide. The milled material was placed in two liters of acetone and stirred for one hour. The acetone was removed by filtration and the material placed on trays to air dry for 24 hours. The final material assayed 5.4 milligrams diethylstilbestrol per gram.

EXAMPLE 2

A solution of 1.5 grams of diethylstilbestrol in 100 milliliters of ethyl alcohol was added to a solution of 50 grams of starch, 12.5 grams of corn syrup and 120 milliliters of water. The solution was placed on a steam bath and the ethyl alcohol evaporated. The material was spread on nylon cloth and air dried for 24 hours at room temperature, followed by oven drying at 60° C. for 24 hours. The product was removed from the cloth and milled to a suitable particle size. The product was washed with acetone and spread out to air-dry.

EXAMPLE 3

Four-hundred milligrams of diethylstilbestrol was mixed by mortaring with 100 grams of starch. Two-hundred and twenty milliliters of water and 25 grams of corn syrup were added to the mixture and heated in a boiling water bath until the starch had gelatinized. The hot material was spread on nylon cloth and allowed to air-dry for 24 hours. The nylon sheet, with the material, was folded and placed in a 60° C. oven for 24 hours. The starch material was removed from the nylon and milled to a suitable particle size, placed in 2 liters of ether and stirred for one hour. The material was removed by filtering and air-dried. A yield of 87 grams of powder assaying 1.7 milligrams of diethylstilbestrol per gram was obtained.

EXAMPLE 4

Twenty-five grams of sucrose and 300 milligrams of diethylstilbestrol were combined and mortared to insure a uniform distribution. This material was slowly added with stirring to a heated solution of 25 grams of carboxymethylcellulose in 250 milliliters of water. The resulting mixture was concentrated by heating to a thick viscous gel; it was then spread on nylon strips and allowed to cool. After 24 hours, the material was placed in a 60° C. oven and dried for 24 hours. The material was removed from the nylon sheets, ground to a suitable particle size, washed with 2 liters of ether and allowed to air-dry.

As stated above, the purpose of this invention is to provide feed supplements containing physiologically potent substances wherein persons handling such supplements are protected from undesirable or even dangerous contact with the active ingredients. In short, the purpose is to protect people rather than to protect the active ingredients in the formulations. In order to demonstrate that the compositions which comprise this invention have achieved their purpose, they have been tested via a skin absorption method and compared to a commercially available preparation which does not embody the invention (a solution of diethylstilbestrol in vegetable oil absorbed on a soybean meal carrier, assaying about 1 gram of diethylstilbestrol per pound of meal). The commercial product was diluted with about 19 parts soybean meal to a concentration of 11 micrograms of diethylstilbestrol per 100 milligrams of meal. Part of the powdered gel prepared in accordance with this invention was diluted in a comparable manner with soybean meal, and part was tested without dilution. The materials to be tested were applied by adhesive bandages to the backs of weanling female rats for a period of three days. The animals were then sacrificed, the uteri removed, and the average weight of the uteri computed and compared to the uterine weight of an untreated control group. Typical results are given in the following table:

*Skin absorption tests*

| Supplement | Dilution | Diethylstilbestrol Assay, micrograms per 100 milligrams | Average Uterine Weight, milligrams (for 5 rats) |
|---|---|---|---|
| Commercial | 1:20 | 11 | 62.8 |
| Example 3 | 1:20 | 8.8 | 11.9 |
| Example 3 | none | 176 | 14.2 |
| Control | | 0 | 18.0 |

These data demonstrate that the compositions of this invention completely protect against absorption of physiologically active materials through the skin, whereas the largest selling commercial preparation, even when diluted 20 to 1 with inert meal, allows very substantial absorption of diethylstilbestrol through the skin.

What is claimed as new and is desired to be secured by Letters Patent of the United States is:

1. An innocuous water-soluble gel, in dry powder form suitable for incorporation in animal feeds, comprising an estrogen dispersed in a natural colloidal material and plasticized with a innocuous polyhydroxy organic substance, the concentration of estrogen being not greater than about 1% by weight of the dry powdered product.

2. A feed supplement containing diethylstilbestrol in a solid vehicle comprising a water-soluble assimilable nontoxic gel and a sugar, the concentration of diethylstilbestrol being not greater than about 1% by weight of the solid product.

3. A feed supplement containing diethylstilbestrol in a dry powdered gel of starch and sugar, the concentration of diethylstilbestrol being not greater than about 1% by weight of the solid product.

4. A feed supplement containing diethylstilbestrol in a dry powdered gel of gelatin and sugar, the concentration of diethylstilbestrol being not greater than about 1% by weight of the solid product.

5. The method of producing a colloidal gel containing not greater than about 1% by weight of an estrogen, suitable for use as an animal feed supplement, which comprises forming an aqueous solution of a nontoxic water-soluble colloid and a polyhydric alcohol, adding an estrogen in solution in a volatile water-miscible organic solvent, evaporating the solvent and cooling the colloidal solution until a gel is formed, and comminuting the dry gel.

6. The method of producing a dry powdered gel containing not greater than about 1% by weight of diethylstilbestrol which comprises dissolving gelatin and corn syrup in hot water, adding diethylstilbestrol to the solution in a water-miscible volatile organic solvent, cooling the solution until gelation occurs, comminuting the gel and washing the comminuted gel with a volatile aliphatic ketone.

References Cited in the file of this patent

UNITED STATES PATENTS

| | | |
|---|---|---|
| 2,487,975 | Koree | Nov. 15, 1949 |
| 2,669,537 | Thompson | Feb. 16, 1954 |
| 2,824,546 | Klette | Feb. 25, 1958 |
| 2,855,341 | Meier et al. | Oct. 7, 1958 |

FOREIGN PATENTS

| | | |
|---|---|---|
| 487,506 | Great Britain | 1938 |
| 109,438 | Australia | 1940 |